United States Patent [19]

Lauzier

[11] 4,307,625
[45] Dec. 29, 1981

[54] HANDLEBAR-MOUNTED CABLE ACTUATOR FOR CYCLE

[75] Inventor: Rene Lauzier, Ruy, France

[73] Assignee: Angenieux-CLB S.A., St. Etienne, France

[21] Appl. No.: 142,983

[22] Filed: Apr. 23, 1980

[30] Foreign Application Priority Data

Apr. 26, 1979 [FR] France ................................ 79 11213

[51] Int. Cl.³ ........................ B62K 23/06; G05G 1/04
[52] U.S. Cl. .................................... 74/489; 74/501 R
[58] Field of Search ...................... 74/488, 489, 501 R

[56] References Cited

U.S. PATENT DOCUMENTS 3,803,941 4/1974 Yoshikawa ........................ 74/489 X
4,193,318 3/1980 Golobay .............................. 74/489

FOREIGN PATENT DOCUMENTS 1077461 4/1954 France .

*Primary Examiner*—Allan D. Herrmann
*Attorney, Agent, or Firm*—Karl F. Ross

[57] ABSTRACT

An actuator for mounting on a part such as a cycle handgrip and for operating a cable having a core and a sheath has a one-piece lever, a one-piece support carrying the lever, and a clamp for securing the support to the part. The lever is unitarily formed with an elongated handle, with a laterally projecting foot having a pair of opposite outwardly facing sides, with respective coaxially aligned cylindrical pivot pins projecting oppositely outwardly from the sides, and with a holding formation for the end of the cable core. The support is unitarily formed with a face shaped to fit against the part, with a recess opening laterally at the face, having a pair of confronting flanks, and shaped to complementarily receive the foot with its sides engaging the flanks, with respective seats opening laterally at the face, opening inwardly at the respective flanks of the recess, and shaped to complementarily receive the respective cylindrical pins when the foot is in the recess, with a guide for the cable core anchored in the holding formation, and with an abutment for the sheath of the cable. The clamp means includes a ring adapted to surround the part carrying the actuator and with a screw engaged through the support with the ends of the ring.

10 Claims, 7 Drawing Figures

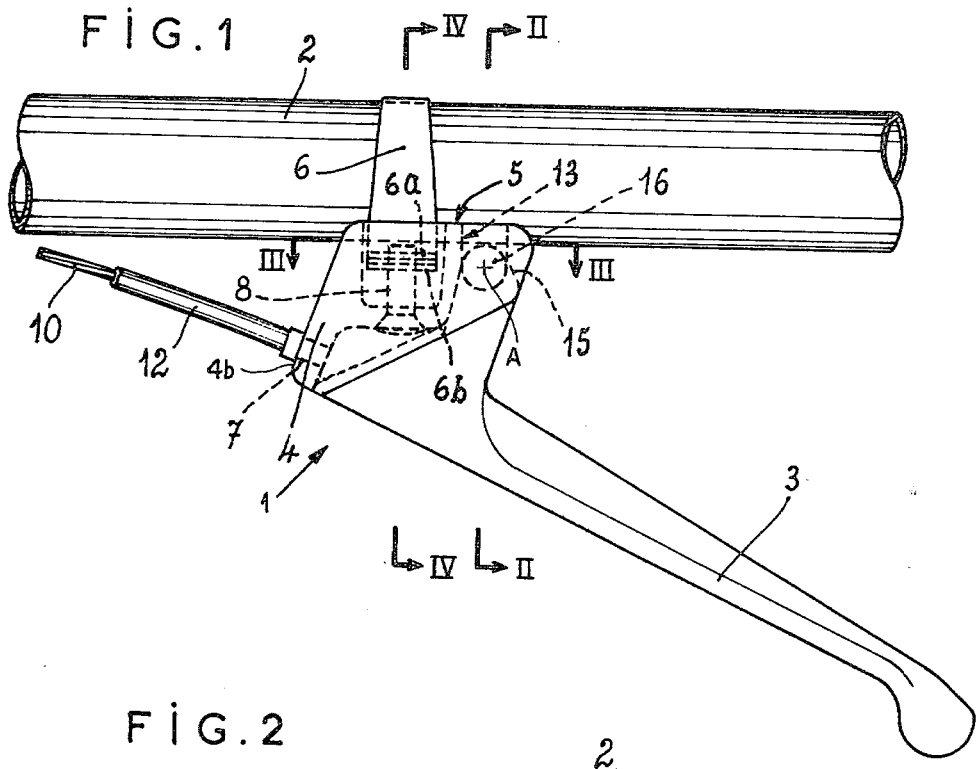

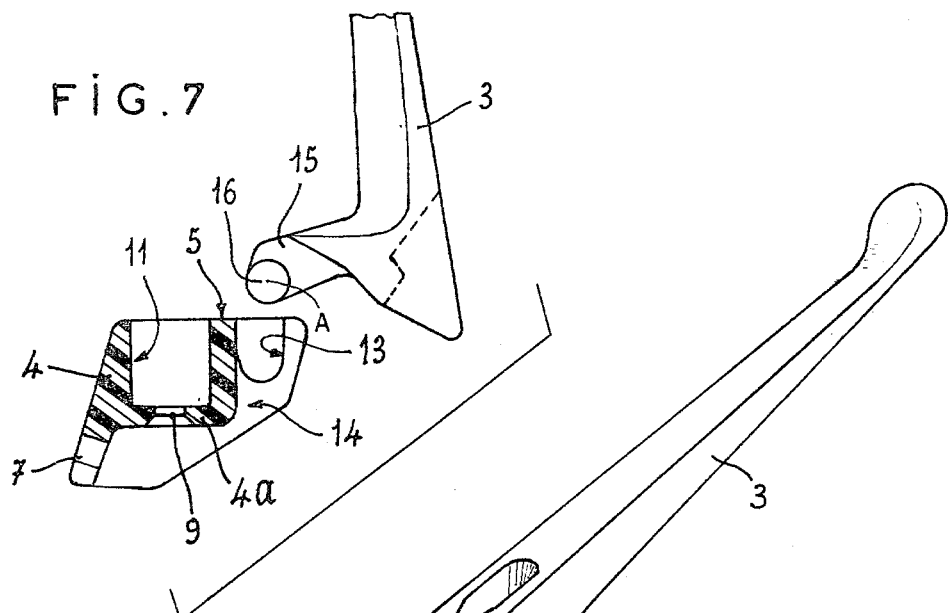
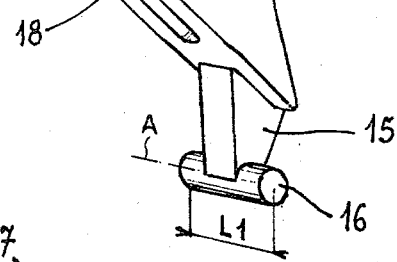
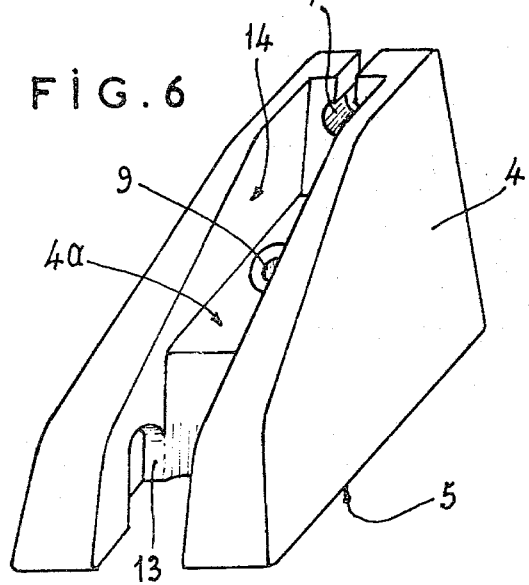

HANDLEBAR-MOUNTED CABLE ACTUATOR FOR CYCLE

FIELD OF THE INVENTION

The present invention relates to a cable actuator of the type normally used on a motorcycle or bicycle to displace the core of a bowden cable relative to its sheath.

BACKGROUND OF THE INVENTION

On a bicycle or a motorcycle, and even on many other devices such as garden equipment and outboard motors, an actuator is provided at one end of a bowden cable for operating mechanism at the other end of the cable. To this end the cable has a flexible but longitudinally incompressible and inextensible sheath surrounding a core that is similarly flexible but longitudinally inextensible and incompressible. The ends of the sheath are anchored at the actuator and at the device being actuated and the ends of the core are connected to a lever at the actuator and the portion of the device to be displaced. Thus it is possible for the actuator to move considerably relative to the device being actuated while at the same time accurate transmission of force from the actuator to the device is possible. This type of arrangement is most commonly used on the brakes of bicycles and motorcycles, on the clutch of a motorcycle, and for operating the throttles of gasoline engines in garden equipment and outboard motors. All such uses are within the scope of the instant invention.

In the standard arrangement the support is formed with a guide for the cable core and an abutment for the end of the sheath of the cable. The core end itself is received in a holding formation or seat of an actuating lever having an elongated handle and a foot projecting laterally from this handle. The support is formed with a recess in which the foot is engaged, and a pivot pin normally passes through the support at this recess and through a hole in the foot, so that the entire actuating lever can pivot relative to the support about this pin. The pin itself is normally formed by the stem between the head and threaded end of a bolt. The support itself is secured to a part such as a cycle hand grip.

The disadvantage of this system is that it has several different parts and is, therefore, somewhat complicated to assemble and relatively failure-prone. Such devices are normally exposed to considerable vibration, so that loosening of them is a problem. Any motorcyclist with some experience has at least once had to deal with the problem of the pivot pin falling out.

It has been suggested in French Pat. No. 1,077,461 to form this pin integrally with the lever. In order to seat it in the support, this support is made of two separate parts that are bolted together on opposite sides of the lever. Although this arrangement does somewhat reduce the complexity of this system, it requires the support to be assembled in a complicated manner. In addition it still leaves the possibility that the assembly can work itself loose so that the lever can separate from the support without warning, that is while the support still remains firmly attached to the part carrying it.

OBJECTS OF THE INVENTION

It is accordingly an object of the instant invention to provide an improved cable actuator.

Another object is to provide such a cable actuator which is mountable on a part such as a cycle hand grip and which is relatively simple in construction so that it is inexpensive to manufacture and easy to assemble and install.

Yet another object is to provide such an actuator which has a minimal number of separate parts, yet which can be easily produced at low cost without machining or complicated manufacture processes.

SUMMARY OF THE INVENTION

These objects are attained according to the instant invention by forming the lever as one piece that is unitarily formed with an elongated handle with a laterally projecting foot having a pair of opposite outwardly facing sides, with respective coaxially aligned cylindrical pivot pins projecting oppositely outwardly from the sides, and with a holding formation for the end of the cable core. The support is also unitarily formed of one piece with a face adapted to fit against the part carrying the actuator, with a recess opening laterally at the face, having a pair of confronting flanks, and shaped to complementarily receive the foot of the lever with the sides thereof engaging these flanks, with respective seats opening laterally at the face, opening inwardly at the respective flanks of the recess, and shaped to complementarily receive the respective cylindrical pins when the foot is received in the recess, with a guide for the cable core that is anchored in the housing formation of the lever, and with an abutment for the sheath of the cable. Clamping means is provided for securing this support to the part with the face laterally engaging the part and with the part laterally closing the recess and the seats. Thus in accordance with the instant invention the actuator, aside from the clamp which secures it to whatever part—cycle handgrip, lawnmower handle, motorboat dashboard—which carries it, is constituted of two simple integrally formed pieces. The part that carries this actuator according to this invention itself constitutes a portion of the actuator and closes the seats holding the pivot pins of the lever so that in combination the structure is extremely rigid. The assembly is extremely rigid when mounted in place as the clamp itself serves not only to hold the support on the part, but also to hold the various parts of the actuator together. During normal use the core of the cable is usually spring-biased so that the spring force will hold the assembly together, nonetheless even in a system with no such spring-biasing the system according to this invention will be stable.

According to further features of this invention the seats are open axially only toward each other at the flanks of the recess and are open laterally only at the face. Thus when the system is assembled these seats are very well protected so that fouling of them which would inhibit pivoting of the lever on the support is largely avoided. Furthermore these pins generally laterally engage the part when the support is clamped to it with the foot in the recess and the seats have substantially semi-cylindrical bases of substantially the same radius of curvature as the pins. In the region of greatest wear, therefore, good surface contact between the pins and the seats is ensured, while at the same time the part itself serves to hold these pins in the seats.

The support is formed in the recess with inwardly projecting bumps that overreach the pins and retain the lever in the support according to another feature of this invention. These bumps are formed after the lever is fitted to the support at the factory to retain the assembly together, although it is possible with modest deformation of the support to separate the lever and the support if necessary. Once assembled on the part, of course, the part will hold the lever tightly in the support and if the core of the bowden cable is tensioned in the normal manner this force will also retain the lever in the support with its pins tightly engaged in their seats.

The clamp means according to this invention includes a clamp ring shaped to surround the part, such as the tubular stem of a handgrip, and screw means for securing this ring to the support. The support is formed between the guide and abutment for the cable sheath on one side and the recess and seats for the lever on the other with a throughgoing laterally open hole and the screw means includes a screw engaged through this hole with the clamp ring. For this purpose one end of the clamp ring is bent over double and is formed with a threaded hole, speednut fashion, into which the screw is engaged. The other end of the ring is formed with a throughgoing hole through which the screw loosely passes. Thus the entire assembly according to the instant invention, even including the clamp, only consists of four separate parts: the lever, the support, the clamp ring, and the screw. The support itself can be made of a durable synthetic resin and the lever of a light metal such as aluminum, whereas both the screw and the clamp are normally made of stainless steel for maximum durability.

BRIEF DESCRIPTION OF THE DRAWING

FIG. 1 is a side view of the actuator combination according to this invention;

FIGS. 2, 3, and 4 are sections taken respectively along lines II—II, III—III, and IV—IV of FIG. 1;

FIG. 5 is a perspective view of the lever of the actuator according to this invention;

FIG. 6 is a perspective view of a support of the actuator according to this invention; and FIG. 7 is a side exploded view partly in section showing how the lever is mounted in the support.

SPECIFIC DESCRIPTION

As seen in the drawing according to the instant invention, an actuator 1 basically formed of an aluminum lever 3 and a nylon support 4 is mounted on a part such as a handgrip 2 and united with a bowden cable having a core 10 and a sheath 12. According to the instant invention the support 4 has a pair of edges forming a face 5 that is concave so as to complementarily fit against the cylindrical surface of the tube 2. A clamp ring 6 has a doubled-over end 6a formed with a threaded hole and with an apertured end 6b that are adapted to overlie each other in a recess 11 formed in the support 4 and opening at the face 5. A screw 8 passes through a hole 9 formed in a web 4a defining the base of the recess 11 and also passes through the holes in the ends 6a and 6b, being threadedly engaged with the hole in the end 6a. Thus tightening of the screw 8 will lock the support 4 tightly on the part 2.

The support 4 also is formed at its front end with a notch 7 through which the core 10 of the cable 10, 12 passes, and forms an abutment 4b at its front face for the end of the sheath 12. Normally the core 10 is spring-biased toward the left and seen in FIG. 1.

The lever 3 is basically formed as a handle, but has a laterally projecting foot or extension 15 from the end of which extend two pins 16 coaxially aligned on an axis A. The support 4 is formed at its rear end with a recess or notch 14 having a pair of flanks against which the parallel sides of the foot or extension 15 can fit. In addition opening into this notch 14 and at the face 5 is a pair of seats 13 having semi-cylindrical bases and shaped to receive the pins 16 when the foot 15 is received in the notch 14. As best seen in FIGS. 1 and 2 when the lever 3 is mounted on the support 4 with the pins 16 in the seats 13 and when it is secured thereto by the clamp ring 6 and screw 8 the part 2 will itself lightly engage the pins 16 to retain them in place in their seats 13. To this end the pins 16 have an aggregate length L1 (FIG. 5) which is substantially equal to or slightly smaller than the distance L measured in line with the axis A between the outer ends of the seats 13. What is more the front end of the lever 3 is formed with a notch or holding formation 18 that receives the end of the core 10, which is normally provided with a swaged-on ball.

Normally the actuator 1 is mounted together at the factory and small bumps 17 (FIG. 2) are formed on it to retain the lever 3 in the notch 14. Of course since the support 4 is made of an at least limitedly elastically deformable synthetic resin, the lever 3 can be separated from it without damage. In any case, the user can easily assemble the entire structure and secure it to the part 2 by means of the screw 8, which in fact is responsible for holding the entire assembly together and indeed for holding the lever 3 in place clamped between part 2 and the support 4. When thus assembled the seats 13 are completely closed so that foreign material cannot enter into them and interfere with the free rotation of the lever 3 about the axis A on the support 4. What is more any loosening of the screw 8 will be easily and instantly sensed by the user who can tighten it. Unlike prior-art systems it is not necessary for the entire assembly to fall apart before the user will notice that something is loosening.

I claim:

1. In combination with a part, such as a cycle handgrip, and with a cable having a core and a sheath, an actuator comprising:

a one-piece lever formed unitarily with
  an elongated handle,
  a laterally projecting foot having a pair of opposite outwardly facing sides,
  respective coaxially aligned cylindrical pivot pins projecting oppositely outwardly from said sides, and
  a holding formation for the end of said cable core;
a one-piece support formed unitarily with
  a face shaped to fit against said part,
  a recess opening laterally at said face, having a pair of confronting flanks, and shaped to complementarily receive said foot with said sides thereof engaging said flanks,
  respective seats opening laterally at said face, opening inwardly at the respective flanks of said recess, and shaped to complementarily receive the respective cylindrical pins when said foot is in said recess,
  a guide for the cable core anchored in said holding formation, and
  an abutment for said sheath of said cable; and
clamp means for securing said support to said part with said face laterally engaging said part and said part laterally closing said recess and said seats.

2. The actuator defined in claim 1 wherein said seats are open axially only toward each other at said flanks, and laterally only at said face.

3. The actuator defined in claim 2 wherein said pins generally laterally engage said part when said support is clamped thereto with said foot in said recess.

4. The actuator defined in claim 3 wherein said seats have substantially semicylindrical bases of substantially the same radius of curvature as said pins.

5. The actuator defined in claim 1 wherein said support is further formed in said recess with bumps overreaching said pins and retaining said lever in said support.

6. The actuator defined in claim 1 wherein said clamp means includes a clamp ring adapted to surround said part, and screw means for securing said ring to said support.

7. The actuator defined in claim 6 wherein said support is formed between said guide and abutment on one side and said recess and seats on the other with a throughgoing laterally open hole, said screw means including a screw engaged through said hole with said clamp ring.

8. The actuator defined in claim 7 wherein said clamp ring has one end formed with a threaded hole threadedly engaging by said screw and with another end formed with a throughgoing hole through which said screw loosely passes.

9. The actuator defined in claim 1 wherein said support is made of a synthetic resin.

10. The actuator defined in claim 1 wherein said lever is formed of aluminum.

* * * * *